March 18, 1952     N. CORDIS     2,589,228
POULTRY NEST APPLIANCE

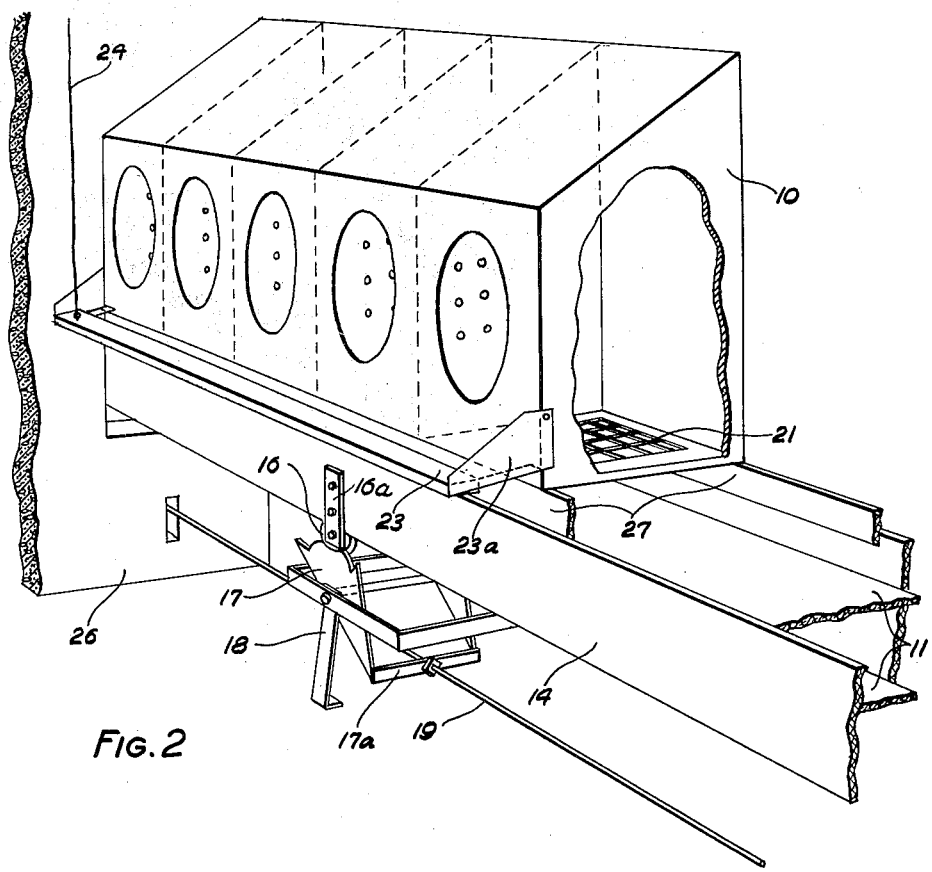
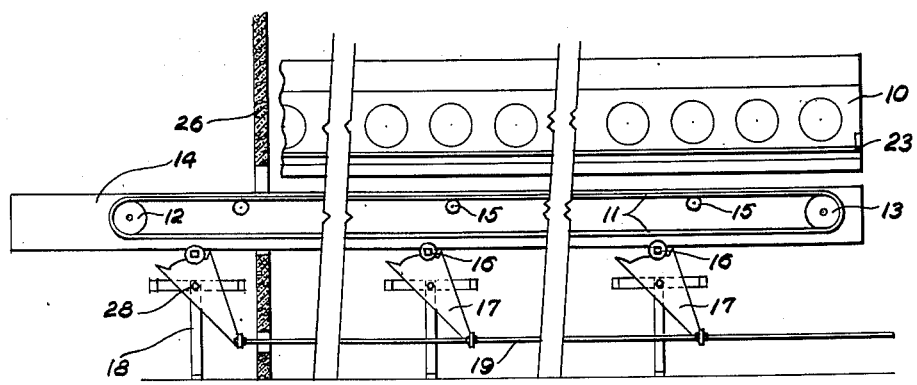

Filed Dec. 12, 1947     3 Sheets-Sheet 3

INVENTOR.
NAT CORDIS
BY Everett A. Johnson
ATTORNEY

Patented Mar. 18, 1952

2,589,228

UNITED STATES PATENT OFFICE 2,589,228

POULTRY NEST APPLIANCE

Nat Cordis, Silver Lake, Wis.

Application December 12, 1947, Serial No. 791,365

7 Claims. (Cl. 119—48)

This invention relates to animal husbandry and more particularly to devices for use in poultry raising. Still more specifically the invention is an improved method and means for gathering eggs from poultry nests.

It has been recognized in recent years by poultry experts that far greater egg production from hens can be obtained if the hens are exposed to a minimum of disturbing elements. To this end, therefore, it has been common practice to permit only certain employees access to the poultry houses for short periods of time. The chickens become accustomed to these particular handlers and are not frighened thereby. It has also been observed that chickens are not disturbed or frightened by recurring sounds or movements which they recognize. Nevertheless, even greater efficiency can be obtained in the production of eggs if all exposure to outside disturbances is reduced to a bare minimum.

It is an object of this invention, therefore, to provide an egg gathering means which can be operated from a point remote from the poultry nests. Another object is to provide a method and automatic means for gathering eggs without disturbing the flock within a poultry shelter. Still another object is to provide a system for retrieving, screening, and replacing the nest material. These and other objects of my invention will become apparent to those skilled in the art as the description of my invention proceeds with reference to the drawings wherein:

Figure 1 is a schematic elevation, partly in section, showing the general assembly of parts;

Figure 2 is a fragmentary perspective view illustrating an enlarged portion of my apparatus of Figure 1;

Figure 3:
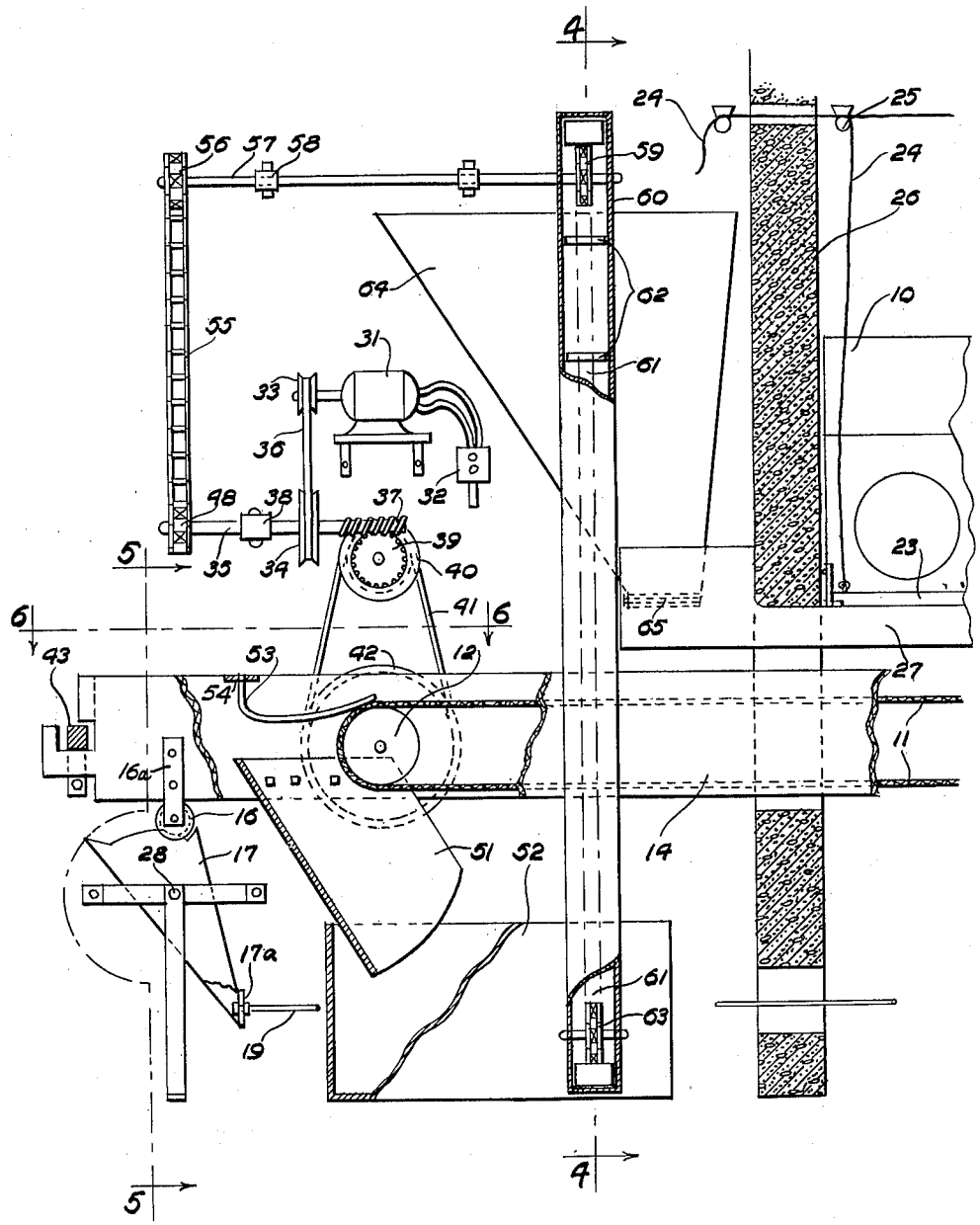
Figure 3 is a schematic elevation of the operating and control mechanism, with some parts removed.

Briefly I attain the objects of my invention by providing a downwardly movable bed for the nests and further providing means for moving the bed horizontally to and fro. More specifically, a horizontally movable belt is mounted in a vertically movable support below a row of nests having grill bottoms. Means for operating the support and the belt are provided outside the poultry house at the egg-gathering station. I also provide means for collecting the bedding (such as wood shavings), lifting the bedding into a superposed hopper, and redistributing the bedding upon the belt which is returned to its original position under the nests.

Thus in operation of my device, the bedding support 11 is lowered from outside the shelter and the flexible webbing or belt carrying the bedding and eggs is moved slowly to a gathering station outside the shelter where the eggs are gathered by hand and the bedding collected in a bin. A portion of the collected bedding is concurrently stored in an upper hopper until all the eggs have been removed from the belt. The direction of travel of the belt is then reversed and the bedding redistributed upon the moving belt. When all the bedding is in place, the belt travel is stopped and the flexible bed raised until it fits snugly below the nests. This places the clean bedding within the nest.

Referring to the drawings, Figure 1 illustrates schematically the general assembly of elements including the nests 10, and the belt 11 movable over pulleys 12 and 13 which are carried by belt support 14. Supplemental pulleys 15 maintain the upper portion of the belt in a substantially taut or level condition. The belt support 14 is carried by rollers 16 which ride on the lifts 17. The master and slave cam lifts 17 are rotatably mounted on brackets 18 and are actuated by rod 19 which is fixed to a lower end of the cam lifts. If desired, an endless cable and pulleys can be substituted for the rod 19. Likewise, hydraulic means may be used to actuate the rod or cable or may be substituted for the cams 17 themselves.

Figure 5:
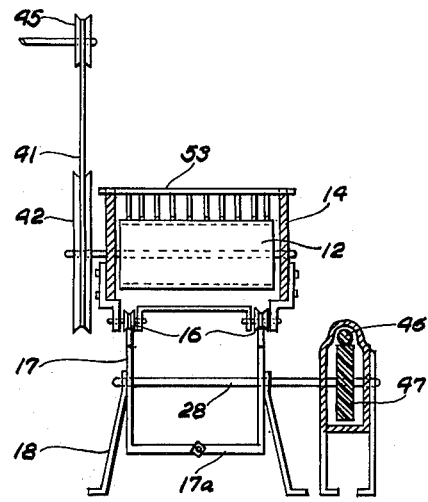
Figure 5 is an end view taken along the line 5—5 in Figure 3 and having some parts removed.
Figure 6:
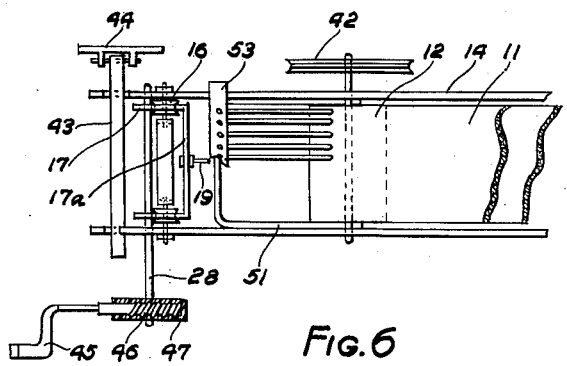
Figure 6 is a top view taken along the line 6—6 in Figure 3 with some parts removed.

In the illustrated embodiment the master cam lift or lever 17 is provided with means for rotating it and one such means is illustrated in Figures 5 and 6. When the master lift is rotated, the rod moves the other or slave lifts uniformly so as to raise or lower the conveyor support 14. Thus the cam surface at the upper end of the lifts 17 contact the rollers 16 and either raises or gradually lowers the conveyor support 14 (and the belt 11). Means are provided for driving pulley 12, for example as illustrated in Figures 3, 5 and 6. The operation of this drive means and the means for rotating the master cam lift 17 will be described in greater detail hereinafter.

In Figure 2 I have illustrated a portion of the assembly within the poultry shelter or enclosure which is adjacent the wall 26 separating the nesting device and the egg gathering station. The nests 10 are provided with bottom grills 21 over the movable bedding support or belt 11 in retractable frame 14. The perch 23 is hinged to the front of the nest 10 and is adapted to be lifted by the cable 24 which passes over a pulley 25. A plurality of perches 23 may be lifted in unison by pulling on the cable 24 beyond the wall 26 as shown in Figure 3. By so swinging the perch upwardly over the entrances to the nests, the openings to the nests are temporarily closed.

Extending between the lower edge of the nest 10 and the upper edge of the conveyor support 14 is a guide 27 which may be fixed either to the nest or to the support 14. In the embodiment shown, the guide is fixed to the lower edge of the nest 10 and slides within the lower support 14.

The slave cam lift 17 is dual and is mounted for rotation on shaft 28 which is supported by bracket 18. The rod 19 fixed to the cross bar 17a passes through the wall 26 and is operated by the master cam lift 17 described in Figures 3, 5 and 6. The supporting roller 16 is fixed to conveyor support 14 by bracket 16a and a similar support and roller is employed on the remote or hidden side of the conveyor support or frame 14. Details of the construction and arrangement of these elements are illustrated in Figure 5.

The primary operating and control mechanism at the egg gathering station is illustrated in Figures 3, 4, 5 and 6. Referring to Figure 3, the conveyor support 14 is shown in its lowermost position where the belt 11 can be rotated. A reversible motor 31 is controlled by switch 32 and is equipped with a take-off pulley 33. A drive belt 36 passes over drive pulley 33 and onto driven pulley 34. This latter pulley 34 turns the shaft 35 having a sprocket 48 at one end and worm 37 at the other. Bracket 38 supports the shaft 35. The worm 37 meshes with the gear 39 to which is fixed a third pulley 40.

A drive belt 41 passes over the pulley 40 and the reducing pulley 42 which is adapted to rotate conveyor pulley 12. The drive belt 41 is adapted to engage the reducing pulley 42 only when the conveyor support 14 is in the position shown and this precludes moving the flexible webbing 11 until it has been displaced downwardly. A hold-down bar 43 is anchored by hinged bracket 44 and resists the tendency of the belt 41 to lift the pulley 42 and hence the conveyor support 14. This hold-down bar should be in the position shown whenever the drive of belt 41 is applied to pulley 42.

The master cam lift 17 is gradually actuated to lower the conveyor bed 14 on rollers 16. Crank 45, worm 46 and gear 47 illustrated in Figures 5 and 6 can be used for this purpose but it is contemplated that other means for controlling the lowering of the conveyor including dashpots, etc., can be used.

Assuming that the conveyor system is being operated to discharge the bedding and carry the eggs to the gathering station, the belt 11 is moved over conveyor pulley 12 counterclockwise. The bedding falls into chute 51 which is fixed to the conveyor support 14 and moves therewith over and into the bedding bin 52. The eggs are ordinarily picked off the belt before they reach the end of the belt. However, as a safeguard, I may provide an egg catcher 53 having a plurality of tines which rest upon the belt 11 over the pulley 12. A pair of slots or grooves 54 can be provided in the upper edge of the conveyor frame 14 to hold the egg catcher 53 in place.

Figure 4:
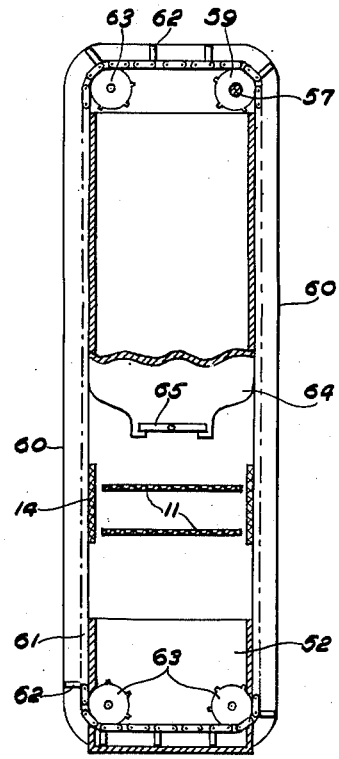
Figure 4 is a view taken along the line 4—4 in Figure 3 to show details of the conveyor lift.

Reverting to sprocket 48 on shaft 35, it is used to drive chain 55, sprocket 56, shaft 57 in supports 58, and elevator sprocket 59. The driven sprocket 59 is mounted in the upper part of an elevator conduit 60 as shown in Figures 3 and 4. An elevator chain 61 having a plurality of paddle lifts 62 passes over the sprocket 59 and the idling sprockets 63 within the elevator conduit 60. New or used bedding is picked up in the bin 52 through which the elevator chain 61 and paddle lifts 62 pass. Bedding is picked up by the paddles 62 and lifted within the conduit 60, either clock-wise or counterclockwise, to the top of the hopper 64. The bedding falls from the paddles 62 as the elevator chain passes over the open hopper and accumulates above the slide valve 65 in the bottom of the hopper 64. Normally when the bedding is being removed from the conveyor belt, the slide valve 65 is closed and the bedding is stored within the hopper 64.

When the gathering of the eggs has been completed and all the bedding has been removed from the nesting belt, the direction the belt travels is reversed. This is simply done by changing the direction of the motor and take-off pulley 33 by means of switch 32. This results in the belt's travelling clock-wise and the direction of the elevator lift 60 is also reversed. Upon driving the conveyor belt toward the nests, the slide valve 65 is opened to redistribute on the belt 11 the bedding stored in the hopper 64. If desired, the belt can be marked to correspond with nest numbers and/or to show when the leading end of the belt carrying the new bedding has reached the remote end of the line of nests.

After the bedding has been replaced and the travel of the conveyor 14 has been stopped, the master cam lift 17 is turned through crank 45, worm 46, and gear 47 fixed to shaft 28. This operates the slave lifts 17 through the rods 19 which are fixed to cross bars 17a. All the lifts thus cooperate to raise the conveyor support 14 upwardly until the flexible bed 11 fits snugly below the grills 21 in the bottom of the nests 10. It should be understood, however, that other gear or hydraulic means can be provided for the purpose of raising or lowering the conveyor support 14 without disturbing the eggs or bedding. In any event, after the flexible bed is in place, all that remains is to lower the perch 23 by releasing the cable 24, and when this has been done, the nests are ready for the laying hens.

One suitable bedding for use in connection with this apparatus is commercial wood shavings, chopped straw, and the like. Materials of this general type can be handled by the conveyor systems and lend themselves to an efficient operation of the egg gathering device. In some instances it is desirable to treat the bedding with insecticides, disinfectants, etc. Either liquid, spray or powder materials may be used and can preferably be added to the bedding in the storage hopper 65. It is contemplated, however, that the treating materials may be applied to the bedding after it has been redistributed on the belt and before it enters the nesting zone.

From the above description it will be apparent that I have attained the objects of my invention and have provided an improved automatic and remotely controlled means for gathering eggs from a poultry house and for renewing the bedding in laying nests. The particular embodiment described, however, is only for the purposes of illustration and it is not intended to limit my invention except as defined by the appended claims.

What I claim is:

1. In a poultry nesting device characterized by having at least one nesting chamber provided with a roof, side walls, rear wall and an apertured front wall, the improvement which comprises a nesting chamber floor having apertures therein, said apertures being at least as large as the greatest diameter of an egg whereby an otherwise unsupported egg may readily pass through any of said apertures, a belt-like sub-floor disposed immediately beneath said chamber floor for supporting eggs within said chamber, said sub-floor being mounted on a vertically adjustable frame, means operatively associated with said sub-floor for lowering said frame to position said sub-floor below and spaced from said chamber floor, whereby said chamber floor and said belt-like sub-floor cooperate, when the latter is elevated, to provide an egg-supporting and nesting material-supporting base to said nesting chamber and whereby said belt-like sub-floor, when the latter is lowered, provides an egg-supporting and nesting material-supporting surface beneath and outside of said nesting chamber.

2. The device defined in claim 1 characterized by having means operatively associated with said vertically adjustable frame for imparting intermittent, horizontal, reciprocating movement to said belt-like sub-floor.

3. The device defined in claim 1 wherein said belt-like sub-floor is the upper half of a continous belt mounted upon pulleys which are supported on said vertically adjustable frame whereby said belt may be elevated, and lowered, in its entirety.

4. The device defined in claim 1 characterized by having means operatively associated with said vertically adjustable frame for imparting intermittent, horizontal, reciprocating movement to said belt-like sub-floor and control means for arresting said horizontal movement when said sub-floor is in elevated position.

5. The device defined in claim 1 wherein said belt-like sub-floor is flexible, substantially impervious, webbing adapted to support nesting material during both horizontal and vertical movement of said sub-floor.

6. The device defined in claim 1 wherein said nesting chamber is in a nesting battery characterized by having at least one horizontally aligned row of contiguous nesting chambers.

7. The device defined in claim 6 wherein said belt-like sub-floor is disposed beneath all of the nesting chambers in an aligned row of such chambers and extends, at one end at least, beyond the endmost nesting chamber of said row whereby said extended portion of said belt-like sub-floor provides an uncovered surface from which eggs and used nesting material may readily be removed and on which fresh nesting material may readily be placed.

NAT CORDIS.

REFERENCES CITED

The following references are of record in the file of this patent:

UNITED STATES PATENTS

| Number | Name | Date |
|---|---|---|
| 1,221,540 | Jones | Apr. 3, 1917 |
| 1,525,381 | Falls | Feb. 3, 1925 |
| 1,876,371 | Westlund | Aug. 6, 1932 |
| 2,314,344 | Cornell | Mar. 23, 1943 |

FOREIGN PATENTS

| Number | Country | Date |
|---|---|---|
| 323,652 | Great Britain | Jan. 9, 1930 |